United States Patent
Nakahata et al.

(10) Patent No.: US 9,030,537 B2
(45) Date of Patent: May 12, 2015

(54) IMAGE DISPLAY OBSERVATION SYSTEM FOR ALTERNATIVELY DISPLAYING THE RIGHT AND LEFT EYE IMAGES CONTINUOUSLY TWO OR MORE TIMES

(75) Inventors: Yuji Nakahata, Kanagawa (JP);
Tsuyoshi Kamada, Kanagawa (JP);
Toshiaki Suzuki, Kanagawa (JP);
Makoto Nakagawa, Tokyo (JP)

(73) Assignee: Sony Corporation (JP)

(*) Notice: Subject to any disclaimer, the term of this patent is extended or adjusted under 35 U.S.C. 154(b) by 778 days.

(21) Appl. No.: 12/660,333

(22) Filed: Feb. 24, 2010

(65) Prior Publication Data
US 2010/0225750 A1 Sep. 9, 2010

(30) Foreign Application Priority Data
Mar. 6, 2009 (JP) ................. P2009-054215

(51) Int. Cl.
H04N 13/04 (2006.01)

(52) U.S. Cl.
CPC ....... *H04N 13/0497* (2013.01); *H04N 13/0438* (2013.01)

(58) Field of Classification Search
CPC .......... H04N 13/0438; H04N 13/0497; H04N 13/0422; H04N 13/0055; H04N 13/0425
USPC ............................. 348/42–60; 349/15; 378/42
IPC ....................................................... H04N 13/02
See application file for complete search history.

(56) References Cited

U.S. PATENT DOCUMENTS

| | | | | |
|---|---|---|---|---|
| 4,214,267 A | * | 7/1980 | Roese et al. | 378/42 |
| 6,448,952 B1 | * | 9/2002 | Toyoda et al. | 345/97 |
| 6,466,268 B1 | * | 10/2002 | Kato et al. | 348/383 |
| 2004/0130645 A1 | * | 7/2004 | Ohmura et al. | 348/333.08 |
| 2008/0303963 A1 | * | 12/2008 | Jung et al. | 349/13 |
| 2008/0316303 A1 | | 12/2008 | Chiu et al. | |
| 2009/0040402 A1 | * | 2/2009 | Tomita et al. | 349/15 |
| 2010/0289974 A1 | * | 11/2010 | Kim et al. | 349/15 |
| 2012/0257027 A1 | * | 10/2012 | Kawahara | 348/56 |

FOREIGN PATENT DOCUMENTS

| | | |
|---|---|---|
| JP | 09-138384 A | 5/1997 |
| JP | 2000-036969 A | 2/2000 |
| JP | 2001045524 A | 2/2001 |
| JP | 2002099249 A | 4/2002 |

(Continued)

OTHER PUBLICATIONS

Office Action from Japanese Application No. 2009-054215, dated Apr. 3, 2012.

(Continued)

*Primary Examiner* — Thao X Le
*Assistant Examiner* — Long Le
(74) *Attorney, Agent, or Firm* — Lerner, David, Littenberg, Krumholz & Mentlik, LLP

(57) ABSTRACT

An image display apparatus includes a signal control unit for receiving an input of an image signal, and converting to a signal for displaying each of a right eye image and a left eye image at least two times continuously; and a display panel, input with the signal converted by the signal control unit, for alternately displaying the right eye image continuing two or more times, and the left eye image continuing two or more times.

15 Claims, 6 Drawing Sheets

(56) References Cited

FOREIGN PATENT DOCUMENTS

| | | | |
|---|---|---|---|
| JP | 2003-045343 A | 2/2003 |
| JP | 2005-107531 A | 4/2005 |
| JP | 2006157775 A | 6/2006 |
| JP | 2006243325 A | 9/2006 |
| JP | 2007011285 A | 1/2007 |
| JP | 2007199295 A | 8/2007 |
| JP | 2007219392 A | 8/2007 |
| JP | 2007531044 A | 11/2007 |
| JP | 2008289147 A | 11/2008 |
| JP | 2008306335 | 12/2008 |
| JP | 2008309873 A | 12/2008 |
| JP | 2009014747 A | 1/2009 |
| JP | 2009015059 A | 1/2009 |
| JP | 2009-025436 | 2/2009 |
| JP | 2009-044295 | 2/2009 |
| JP | 2009031523 | 2/2009 |
| JP | 2010-117437 | 5/2010 |
| WO | 2006126373 A1 | 11/2006 |

OTHER PUBLICATIONS

European Search Report EP 10154827, dated Dec. 29, 2010.
Office Action from Japanese Application No. 2009-054215, dated Feb. 22, 2011.
Office Action from Japanese Application No. 2009-054215, dated Mar. 26, 2013. (3 pages).
Office Action from Japanese Application No. 2009-054215, dated Mar. 26, 2013. (2 pages).
Office Action from Chinese Application No. 2012-10206372.0, dated Jan. 13, 2014.
Office Action from Chinese Application No. 2012-10206377.3, dated Jan. 13, 2014.
Office Action from Japanese Application No. 2009-054215, dated Apr. 8, 2014.
Japanese Office Action for JP Application No. 2009054215, dated Mar. 3, 2015.

* cited by examiner

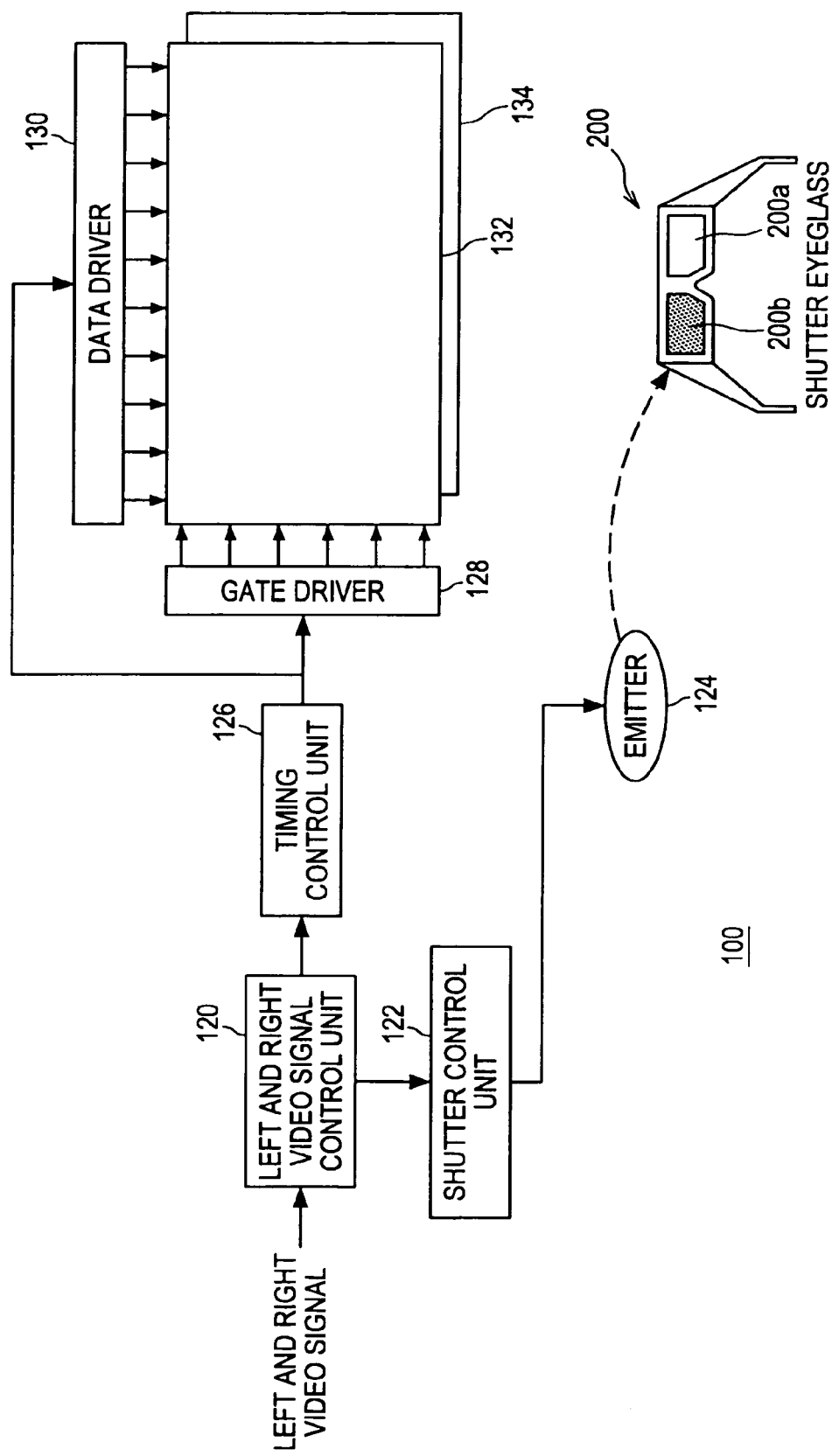

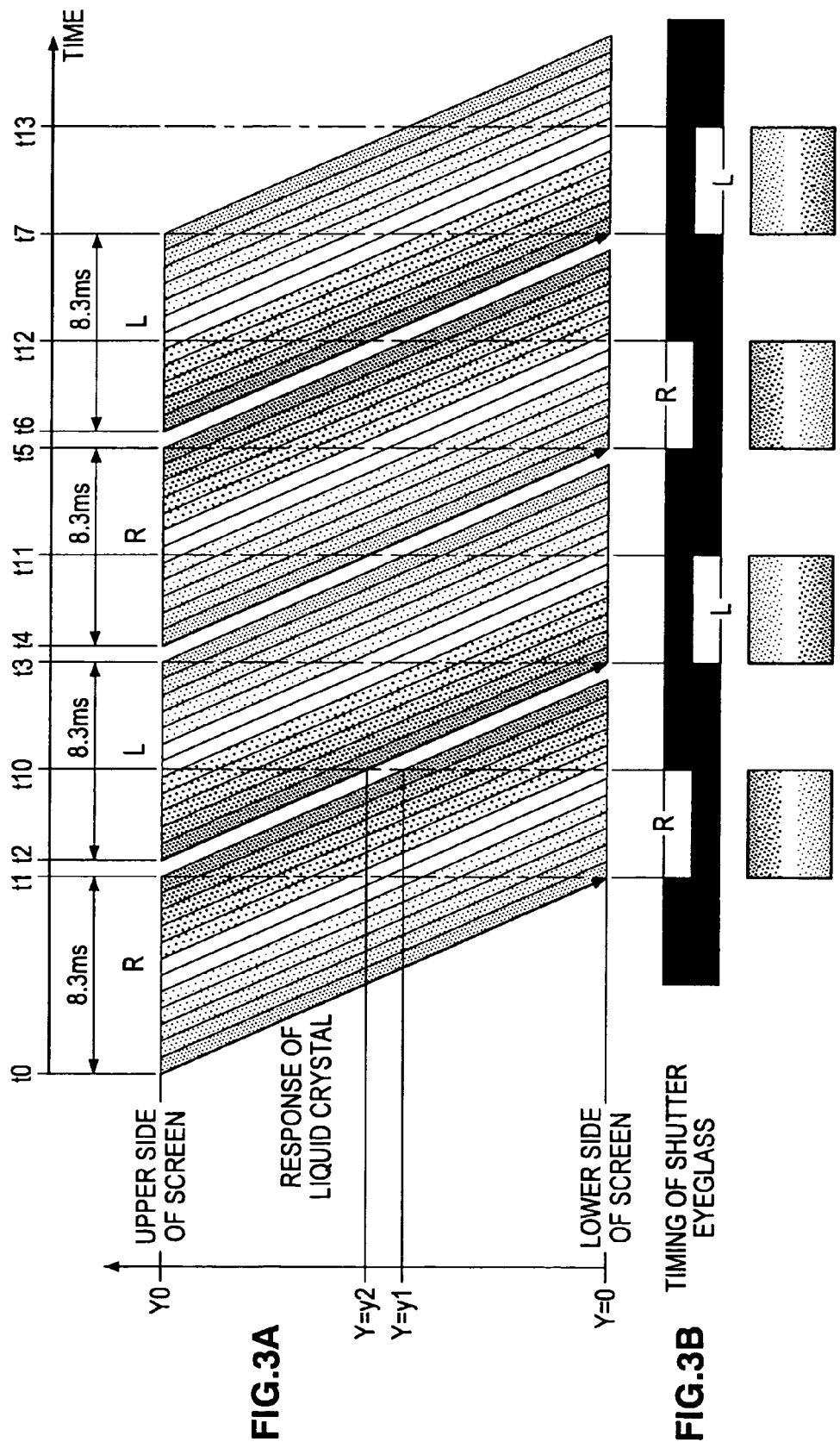

PRINCIPLE OF WRITING AND OPENING AND CLOSING OF SHUTTER

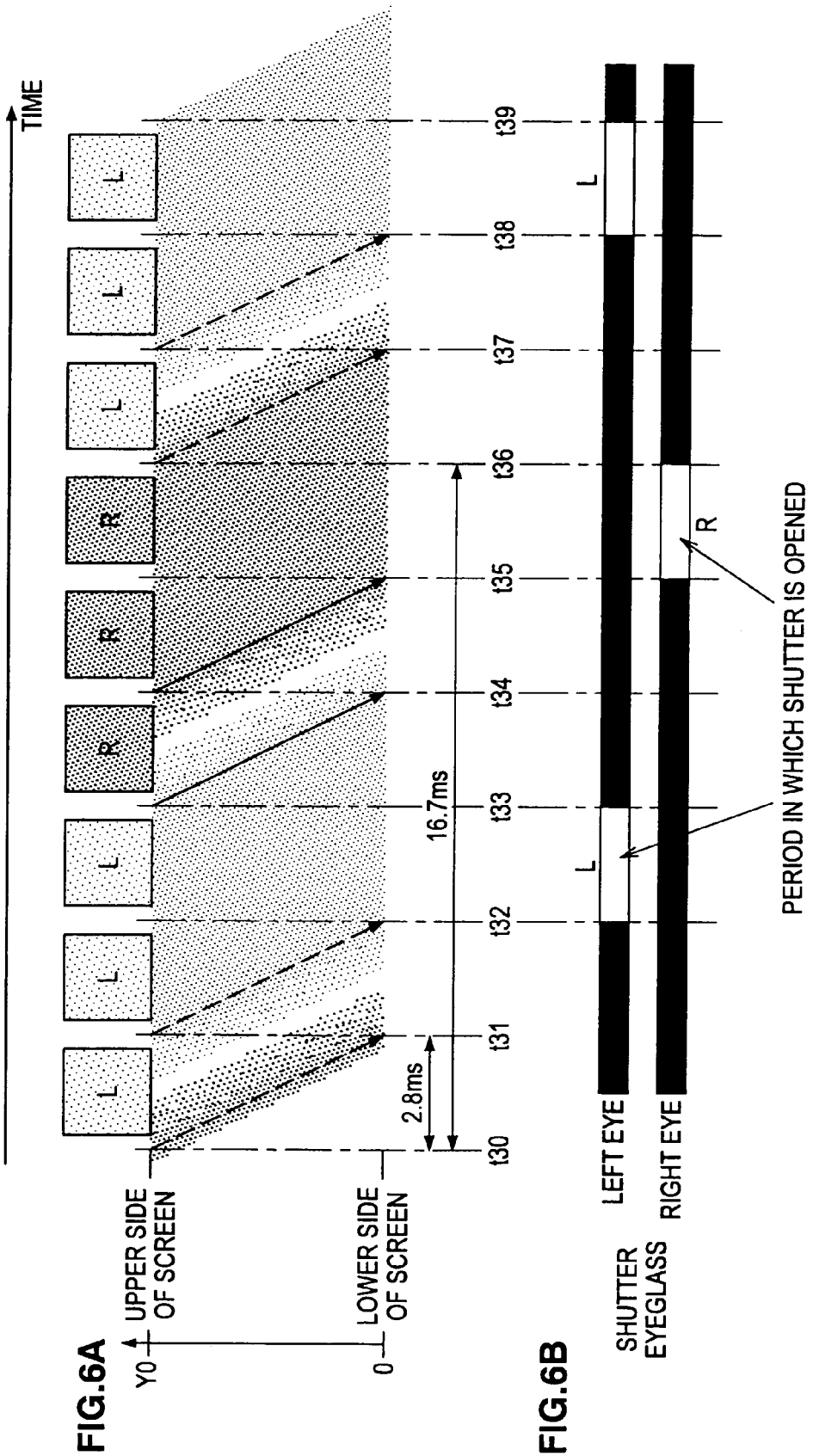

IMAGE DISPLAY OBSERVATION SYSTEM FOR ALTERNATIVELY DISPLAYING THE RIGHT AND LEFT EYE IMAGES CONTINUOUSLY TWO OR MORE TIMES

CROSS-REFERENCE TO RELATED APPLICATION

The present application claims priority from Japanese Patent Application No. JP 2009-054215 filed in the Japanese Patent Office on Mar. 6, 2009, the entire content of which is incorporated herein by reference.

BACKGROUND OF THE INVENTION

1. Field of the Invention

The present invention relates to an image display apparatus, an image display observation system, and an image display method.

2. Description of the Related Art

In the related art, as described in Japanese Patent Application Laid-Open Nos. 9-138384, 2000-36969, and 2003-45343, a method of alternately providing a left eye image and a right eye image having disparity to a display at a predetermined cycle, and observing the image with an eyeglass equipped with a liquid crystal shutter drive in synchronization with the predetermined cycle is known.

SUMMARY OF THE INVENTION

However, when observing a three-dimensional image display with a shutter eyeglass method, as in the examples of the related art, issues due to factors in characteristics of the display apparatus and the shutter eyeglass such as lack of response speed of the image display apparatus and lack of contrast of the liquid crystal shutter arise. Such factors cause a phenomenon (hereinafter referred to as crosstalk) in which one part of the right eye image leaks to the left eye and one part of the left eye image leaks to the right eye.

In particular, in the three-dimensional image display observation system, the response speed becomes an issue if the display is configured by a liquid crystal display and the like. In other words, in the liquid crystal display, the video signal is provided line sequentially from one end of the screen (e.g., upper side of the screen) towards the other end (e.g., lower side of the screen), but a response delay occurs in the timing of writing from one end to the other end.

Due to the lack of response speed of the liquid crystal, the write of the right eye image eventually starts at the lower side of the screen at the time point the upper side of the screen reaches a desired luminance when writing the right eye image. When writing the left eye image as well, the write of the left eye image eventually starts at the lower side of the screen at the time point the upper side of the screen reaches a desired luminance.

Thus, it becomes difficult to open the liquid crystal shutter at the timing only one of either the right eye image or the left eye image is displayed at both the upper side of the screen and the lower side of the screen, whereby the right eye image and the left eye image mix and the issue of cross talk visually recognized by the user arises. Furthermore, if the liquid crystal shutter is opened in a state the liquid crystal is not fully responding due to the lack of response speed of the liquid crystal, the user may not be able to visually recognize the video of the desired luminance.

In light of the foregoing, it is desirable to provide a novel and improved image display apparatus, an image display observation system, and an image display method capable of reliably suppressing the occurrence of crosstalk when a display having a relatively slow response speed such as the liquid crystal display is used.

According to an embodiment of the present invention, there is provided, an image display apparatus includes a signal control unit for receiving an input of an image signal, and converting to a signal for displaying each of a right eye image and a left eye image at least two times continuously, and a display panel, input with the signal converted by the signal control unit, for alternately displaying the right eye image continuing two or more times, and the left eye image continuing two or more times.

In this configuration, the image display apparatus includes a shutter control unit for generating a timing signal indicating a switching timing of the right eye image and the left eye image to notify the switching timing of the right eye image and the left eye image with respect to a viewing eyeglass having right eye and left eye shutters. A period the shutter closes based on the timing signal is at least one left and right write time.

In this configuration, the timing signal generates a period in which the right eye shutter and the left eye shutter are both closed.

In this configuration, the period the shutter closes based on the timing signal includes at least one partial period of a first display period of the right eye image or the left eye image.

In this configuration, the period the shutter opens based on the timing signal is at least one part of a last display period in each of the right eye image or the left eye image displayed continuously for two or more times.

In this configuration, the image display apparatus further includes a luminance correction unit for correcting a luminance of each continuous image at the right eye image or the left eye image continuing two or more times.

According to another embodiment of the present invention, there is provided an image display observation system includes an image display apparatus and a three-dimensional image observation eyeglass. The image display apparatus includes a signal control unit for receiving an input of an image signal, and converting to a signal for displaying each of a right eye image and a left eye image at least two times continuously, a display panel, input with the signal converted by the signal control unit, for alternately displaying the right eye image continuing two or more times, and the left eye image continuing two or more times, and a shutter control unit for generating a timing signal indicating a switching timing of the right eye image and the left eye image. The three-dimensional image observation eyeglass, including right eye and left eye shutters, for alternately opening the right eye and the left eye shutters based on the timing signal.

In this configuration, a contrast ratio of light transmissivity in an opened state with respect to a closed state of the shutter is greater than or equal to 1000 in the three-dimensional image observation eyeglass.

According to another embodiment of the present invention, there is provided an image display method, includes the steps of receiving an input of an image signal, and converting to a signal for displaying each of a right eye image and a left eye image at least two times continuously; and receiving the signal converted by the signal control unit, and alternately displaying the right eye image continuing two or more times, and the left eye image continuing two or more times.

According to the embodiments of the present invention described above, the occurrence of crosstalk can be reliably suppressed when a display having a relatively slow response speed such as the liquid crystal display is used.

BRIEF DESCRIPTION OF THE DRAWINGS

FIG. 2 is a block diagram showing the configuration of an image display apparatus;

FIGS. 3A and 3B are timing charts showing the timing of the left and right video displays and the opening and closing of liquid crystal shutters;

FIGS. 6A and 6B are schematic views showing an example in which the writing is continuously carried out three times for each of the right eye image R and the left eye image L.

DETAILED DESCRIPTION OF THE EMBODIMENTS

Figure 1:
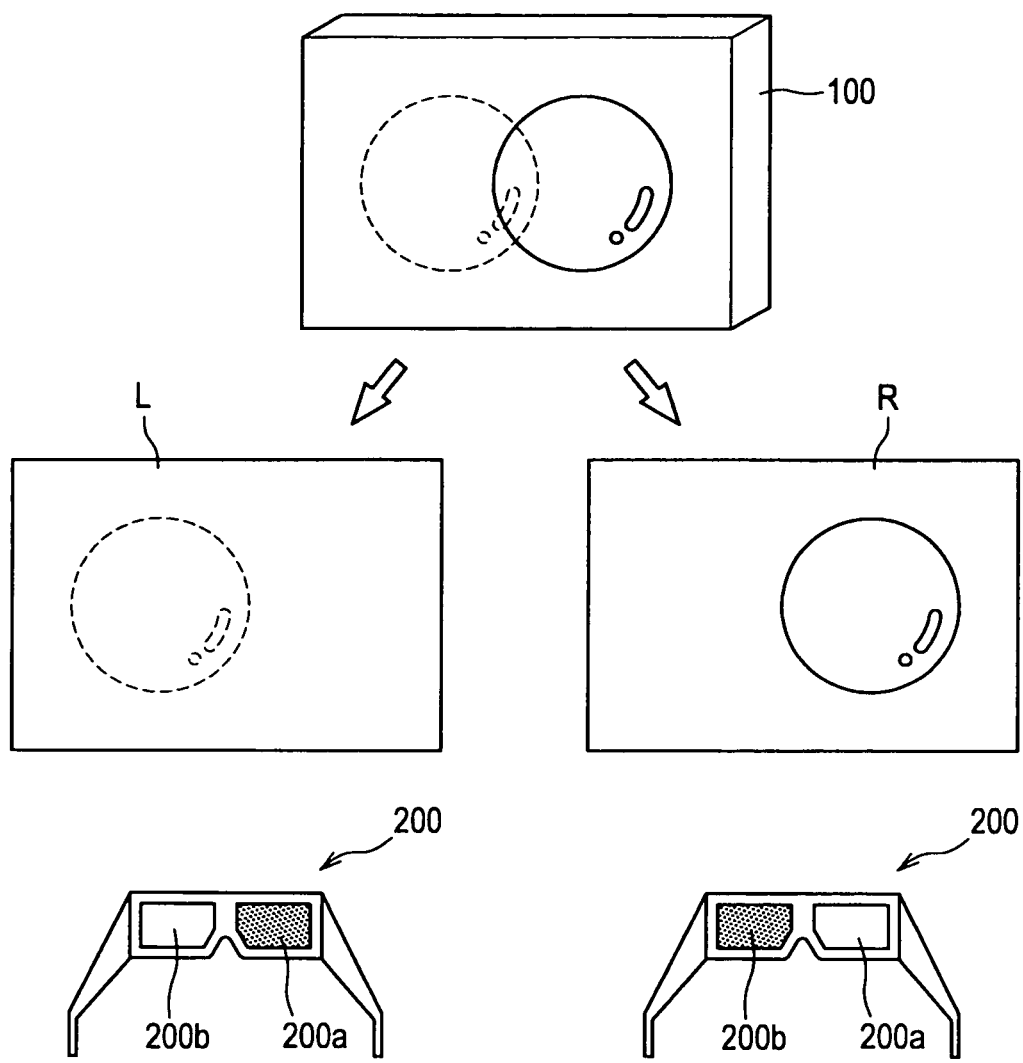
FIG. 1 is a schematic view showing a configuration of an image display observation system according to one embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

The description will be made in the following order.
(1) Example of system configuration
(2) Example of configuration of image display apparatus
(3) Regarding occurrence of crosstalk when liquid crystal display is used
(4) Example of writing two times according to present embodiment
(5) Regarding contrast of liquid crystal shutter
(6) Example of writing three times according to present embodiment

[(1) Example of System Configuration]

FIG. 1 is a schematic view showing a configuration of an image display observation system according to one embodiment of the present invention. As shown in FIG. 1, the system according to the present embodiment includes an image display apparatus 100 configured by a liquid crystal display (LCD), and a displayed image viewing eyeglass 200.

The image display apparatus 100 alternately displays a right eye image R and a left eye image L for every field. The displayed image viewing eyeglass 200 includes a pair of liquid crystal shutters 200a, 200b at the portion corresponding to the lens. The liquid crystal shutters 200a, 200b alternately perform the opening and closing operation in synchronization with the image switching for every field of the image display apparatus 100. In other words, the liquid crystal shutter 200b for the left eye is in the closed state and the liquid crystal shutter 200a for the right eye is in the opened state in the field the right eye image R is displayed on the image display apparatus 100. The opposite operation is performed in the field the left eye image L is displayed.

Through such operation, only the right eye image R enters the right eye and only the left eye image L enters the left eye of the user viewing the image display apparatus 100 while wearing the displayed image viewing eyeglass 200. The right eye and left eye images are synthesized inside the eye of the viewer, and an image displayed on the image display apparatus 100 is three-dimensionally recognized.

[(2) Example of Configuration of Image Display Apparatus]

The configuration of the image display apparatus 100 will now be described. FIG. 2 is a block diagram showing the configuration of the image display apparatus 100. As shown in FIG. 2, the image display apparatus 100 includes a left and right video signal control unit 120, a shutter control unit 122, an emitter (light emitting element) 124, a timing control unit 126, a gate driver 128, a data driver 130, a liquid crystal display panel 132, and a backlight 134.

The liquid crystal display panel 132 is configured by a liquid crystal layer, transparent electrodes facing each other with the liquid crystal layer in between, a color filter, and the like. In the liquid crystal display panel 132, the liquid crystals twisted to a predetermined angle and oriented are sealed between transparent plates such as glass, thereby forming the liquid crystal layer. The liquid crystals are not limited to TN mode, and may be VA mode or IPS mode.

The left and right video signals corresponding to the right eye image R and the left eye image L are input to the left and right video signal control unit 120. The left and right video signal control unit 120 alternately outputs the left and right video signals to alternately display the right eye image R and the left eye image L on the liquid crystal display panel 134. The left and right video signal control unit 120 also performs conversion such that two signals of the same one frame continues for each of the right eye video signal and the left eye video signal to perform writing two times, to be hereinafter described, based on the input left and right video signals.

The right eye video signal and the left eye video signal converted by the left and right video signal control unit 120 are input to the timing control unit 126. The timing control unit 126 converts the right eye video signal and the left eye video signal to signals to be input to the liquid crystal display panel 132, and generates a pulse signal used for the operation of the gate driver 128 and the data driver 130.

The signals converted by the timing control unit 126 are input to the gate driver 128 and the data driver 130, respectively. The gate driver 128 and the data driver 130 receive the pulse signal generated by the timing control unit 126, and emit each pixel of the liquid crystal display pane 1132 based on the input signals. The video is thereby displayed on the liquid crystal display panel 132.

The left and right video signal control unit 120 sends a timing signal indicating the timing of switching of the video to the shutter control unit 122 for the right eye video signal and the left eye video signal converted such that two signals of the same one frame continue. The shutter control unit 122 sends a drive signal for emitting the emitter 126 to the emitter 126 based on the timing signal sent from the left and right video signal control unit 120. The emitter 126 configured by a light emitting element such as a light emitting diode emits light according to the drive signal sent from the shutter control unit 122, and transmits an optical signal indicating the timing of switching of the left and right video signals to the displayed image viewing eyeglass 200.

The details of the displayed image viewing eyeglass 200 will be omitted, but a sensor for receiving the optical signal transmitted from the emitter 126 is arranged. The displayed image viewing eyeglass 200 that received the optical signal alternately performs the opening and closing operation of the liquid crystal shutters 200a, 200b in synchronization with the timing of switching of the right eye video signal and the left eye video signal of the image display apparatus 100.

[(3) Regarding Occurrence of Crosstalk when Liquid Crystal Display is Used]

FIGS. 3A and 3B are timing charts showing the timing of the left and right video displays and the opening and closing of the liquid crystal shutters 200a, 200b. As described above, the right eye image R and the left eye image L are alternately displayed in the image display apparatus 100, but flicker (flickering of screen) occurs if the drive frequency at which one frame of the right eye image R or the left eye image L is displayed is lower than or equal to 60 [Hz]. Thus, a case in which one frame of the right eye image R or the left eye image L is displayed at 120 [Hz] is shown in FIGS. 3A and 3B. In other words, in FIGS. 3A and 3B, each of the right eye image R and the left eye image L is driven at the drive frequency of 120 [Hz], and the time the right eye image R or the left eye image L is displayed is 1/120 [Hz]=8.3 [ms].

In the liquid crystal display panel 132, the display is normally performed line sequentially from one end to the other end of the screen. In FIG. 3A, a state in which the display is performed line sequentially from the upper side (Y=Y0) to the lower side (Y=0) of the liquid crystal display panel, and the luminance is changed with time at each position in the vertical direction from the upper side to the lower side.

As shown in FIG. 3A, the right eye image R is displayed from time t0 to t1 at the upper side (Y=Y0) of the screen, and the left eye image L is displayed from time t2 to t3 after a predetermined blank period. Thereafter, the right eye image R is displayed from time t4 to t5, and the left eye image L is displayed from time t6 to t7 with the predetermined blank period in between.

Focusing on the upper side (Y=Y0) of the screen at time t0 to t1 in which the right eye image R is displayed, the luminance of the upper side of the screen rises with elapse of time when the display of the right eye image R starts at time t0, and reaches the desired luminance at time t1. The display of the right eye image R at the upper side of the screen is then finished. In the present specification, the display to the liquid crystal display panel 132 is sometimes referred to as write of display data to the liquid crystal panel 132. As described above, since the display is performed line sequentially from the upper side to the lower side of the screen in the liquid crystal display panel 132, the time at which the display of the right eye image R starts becomes later than t0, and the time at which the display of the right eye image R is finished becomes later than t1 towards the lower side.

Similarly, focusing on the upper side (Y=Y0) of the screen at time t2 to t3 in which the left eye image L is displayed, the luminance of the upper side of the screen rises with elapse of time when the display of the left eye image L starts at time t2, and reaches the desired luminance at time t3. The display of the left eye image L at the upper side of the screen is then finished. For the left eye image L as well, the time at which the display of the left eye image L starts becomes later than t2, and the time at which the display of the left eye image L is finished becomes later than t3 towards the lower side.

As shown in FIG. 3A, since the response speed of the liquid crystal is relatively slow when the display is performed line sequentially, the write eventually starts at the lower side of the screen at the time point the upper side of the screen reaches the desired luminance at time t1 for the write of the right eye image R. For the write of the left eye image L as well, the write eventually starts at the lower side of the screen at the time point the upper side of the screen reaches the desired luminance at time t3.

FIG. 3B shows the opening and closing timing of the liquid crystal shutters 200a, 200b. As shown in FIG. 3B, the liquid crystal shutter R for the right eye (liquid crystal shutter 200a) is opened at between time t1 to t10, and between time t5 to t12. The liquid crystal shutter L for the left eye (liquid crystal shutter 200b) is opened at between time t3 to t11, and between time t7 to t13.

When the liquid crystal shutter 200a is opened at between time t1 and t10, the right eye image R is displayed at the timing the liquid crystal shutter 200a is opened in the region from the lower side (Y=0) of the screen to Y=y1 shown in FIG. 3A, so that the right eye image R is visually recognized by the right eye of the user. However, in the region of Y>y2, the display of the right eye image R is finished and the next left eye image L is displayed while the shutter 200a is opened. At the upper side (Y=Y0) of the screen, the left eye image L of the next frame is displayed between time t1 and t10. Therefore, the user visually recognizes the video in the transient state of transitioning from the right eye image R to the left eye image L near the middle between the lower side and the upper side of the screen of Y>y2, and visually recognizes the left eye image L of the next frame near the upper side (Y=Y0) of the screen. The right eye image R and the left eye image L thus mix, and the issue of crosstalk visually recognized by the user arises.

Although the right eye image R is displayed between time t1 to t10 while the liquid crystal shutter 200a is opened near the lower side (Y=0) of the screen, the liquid crystal may not sufficiently respond as the liquid crystal shutter 200a is opened immediately after the display starts at time t1. Thus, the video visually recognized by the user near the lower side (Y=0) of the screen does not have a sufficiently high luminance, and the user may not visually recognize the video of the desired luminance.

[(4) Example of Writing Two Times According to Present Embodiment]

To resolve the occurrence of cross talk caused by the lack of response speed of the liquid crystal, the lack of luminance and the like, the present embodiment adopts a method of enhancing the drive frequency of the liquid crystal panel, and double displaying (writing) one frame of left and right images on the liquid crystal display panel 132.

FIGS. 4A to 4D are timing charts showing the principle of writing two times and the opening and closing of the liquid crystal shutters 200a, 200b according to the present embodiment, and show a case in which the right eye image R and the left eye image L are respectively displayed at the drive frequency of 240 [Hz]. In FIGS. 4A to 4D, the time the right eye image R or the left eye image L is displayed by one writing is 1/240 [Hz]=4.2 [ms].

Figure 4A:
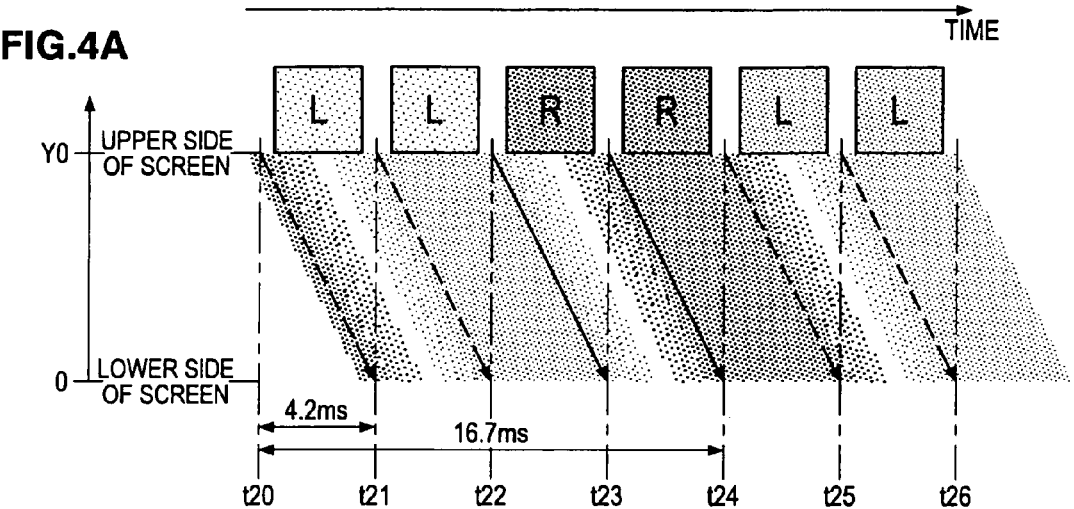
FIGS. 4A to 4D are timing charts showing the principle of writing two times and the opening and closing of the liquid crystal shutters according to the present embodiment.
Figure 4B:
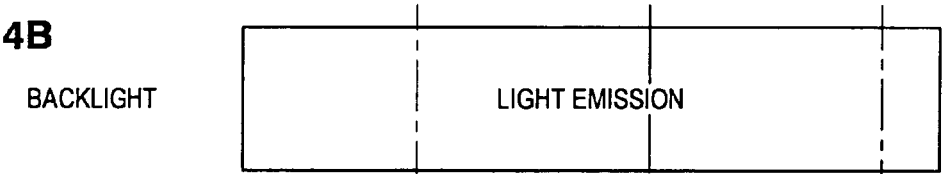

Similar to FIG. 3A, FIG. 4A a state in which the luminance is changed with time at each position in the vertical direction from the lower side (Y=0) to the upper side (Y=Y0) of the liquid crystal display panel 132 is shown. FIG. 4B shows a state in which the backlight 134 of the liquid crystal display panel 132 is emitting light. As shown in FIG. 4B, the backlight 134 is lighted on a constant basis in the present embodiment.

Figure 4C:
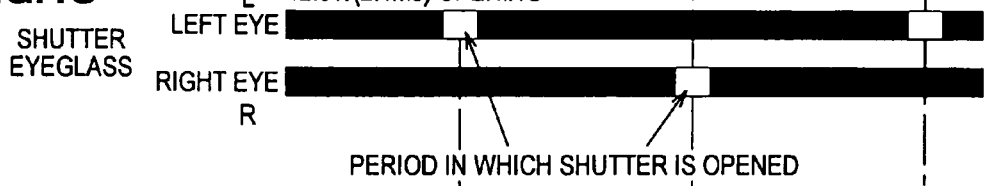
Figure 4D:
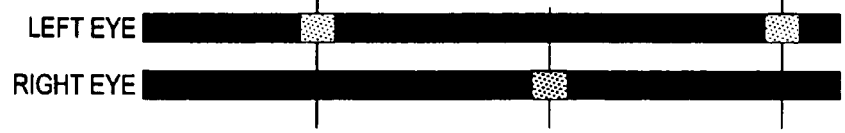

FIG. 4C shows the opening and closing timing of the liquid crystal shutters 200a, 200b, similar to FIG. 3B. FIG. 4D shows a state in which the right eye image R enters the right eye and the left eye image L enters the left eye of the user wearing the viewing eyeglass 200 by the opening and closing of the liquid crystal shutters 200a, 200b.

As shown in FIG. 4A, the left eye image L is written during the 4.2 [ms] from time t20 to t21 at the upper side (Y=Y0) of the screen, and the left eye image L is continuously written during the 4.2 [ms] from time t21 to t22. The left eye image L written between time t20 and t21 and the left eye image written between time t21 and t22 are basically the same image, but may differ due to adjustments such as overdrive process and the like. The process of overdrive and the like includes a process of comparing the actual signal level in the second writing and the first video signal level (drive amount) and performing the process of correcting the luminance value that is not reached in the first writing, and a process of correcting the swing-over phenomenon and the like. The overdrive can also be performed in the first writing. Such processes can be carried out by the timing control unit 126, and thus the timing control unit 126 also functions as a luminance correction unit by the process such as the overdrive. A predetermined blank period may be provided between the left eye image L written the first time and the left eye image L written the second time.

The right eye image R is written after the left eye image L is written twice. For the right eye image R as well, the right eye image R is written during the 4.2 [ms] from time t22 to t23, and then the right eye image R is continuously written during the 4.2 [ms] from time t23 to t24 at the upper side (Y=Y0) of the screen. The right eye image R written between time t22 and t23 and the right eye image written between time t23 and t24 are basically the same image, but may differ due to adjustments such as overdrive process and the like. A predetermined blank period may be provided between the right eye image R written the first time and the right eye image R written the second time, or between the left eye image L and the right eye image R.

Generally, the response time of the liquid crystal display device is relatively slow, and thus each pixel does not achieve the desired luminance if the write time is a short time. Thus, if the right eye image R and the left eye image L are alternately written with the drive frequency increased, the write time (=4.2 ms) of one time becomes short and the desired luminance is reached only after the first writing, and hence the timing both the upper side and the lower side of the screen reach the desired luminance does not exist.

In the present embodiment, the right eye image R and the left eye image L are respectively written twice, so that the desired luminance can be held at the time of the second writing since the same image is already written the first time and the state in which the desired luminance is reached at both the upper side and the lower side of the screen can be realized.

In FIG. 4A, at the time point of time t22, the luminance of the left eye image L reached the desired level in the entire region from the upper side of the screen to the lower side of the screen. Therefore, as shown in FIGS. 4C and 4D, only the left eye image L is visually recognized by the left eye of the user and the occurrence of crosstalk can be reliably suppressed by opening the liquid crystal shutter 200b only for a predetermined period (e.g., 2.1 ms) having the time t22 as the center. The crosstalk and the luminance are in a trade-off relationship, so that the shutter-open period can be appropriately set depending on which to prioritize.

Similarly, for the right eye image R, at the time point of time t24 shown in FIG. 4A, the luminance of the right eye image R reached the desired level in the entire region from the upper side of the screen to the lower side of the screen. Therefore, as shown in FIGS. 4C and 4D, only the right eye image R is visually recognized by the right eye of the user and the occurrence of crosstalk can be reliably suppressed by opening the liquid crystal shutter 200a only for a predetermined period (e.g., 2.1 ms) having the time t24 as the center.

As described above, the desired luminance is not reached at the lower part of the screen at the end of writing in the first writing if the drive frequency of the liquid crystal is increased, and thus the liquid crystal shutters 200a, 200b are closed in at least one partial interval at the time of first writing, which is during the transient response of the liquid crystal display panel 132. More specifically, the liquid crystal shutters 200a, 200b are closed in the interval of 4.2 ms corresponding to at least 50% of about 8.4 ms in which the right eye image R or the left eye image L is displayed. The video in the transient response by the first writing is thus avoided from being visually recognized by the user. An interval in which both liquid crystal shutters 200a, 200b are closed is provided to suppress the crosstalk.

In the present embodiment, as shown in FIG. 4C, the liquid crystal shutter R for the right eye (liquid crystal shutter 200a) is opened only for a predetermined time (2.1 ms) having the time t24 as the center. The liquid crystal shutter L for the left eye (liquid crystal shutter 200b) is opened only for a predetermined time (2.1 ms) having the time t22, t26 as the center.

At the time point of time t24, the second writing of the right eye image R starts at the lower side of the screen, and the second writing of the right eye image R ends at the upper side of the screen. Therefore, the right eye image R by the first writing is not visually recognized by the right eye of the user by opening the liquid crystal shutter 200a at the time point of time t24, and the right eye image R by the second writing is visually recognized by the right eye of the user in the entire region from the lower side to the upper side of the screen.

Similarly, at the time points of t22, t26, the second writing of the left eye image L starts at the lower side of the screen, and the second writing of the left eye image L ends at the upper side of the screen. Therefore, the left eye image L by the first writing is not visually recognized by the left eye of the user by opening the liquid crystal shutter 200b at the time point of time t22 or time t26. The left eye image L by the second writing is thus visually recognized by the left eye of the user in the entire region from the lower side to the upper side of the screen.

Therefore, if the desired luminance is reached in the first writing and such luminance is held in the second writing, the user can visually recognize the video that reached the desired luminance in the entire screen. Therefore, at the time points of t22, t24, and t26 shown in FIG. 4C, the occurrence of the crosstalk can be reliably suppressed by opening the liquid crystal shutters 200a, 200b only for a predetermined minimum time (e.g., 2.1 ms). In particular, the occurrence of the crosstalk can be reliably suppressed by providing a period of opening the liquid crystal shutters 200a, 200b before the timing of switching from the right eye image R to the left eye image L or the timing of switching from the left eye image L to the right eye imager at the upper side of the screen.

As described above, according to the example of writing two times according to the present embodiment, the occurrence of the crosstalk in which the right eye image R and the left eye image L mix can be reliably suppressed.

[(5) Regarding Contrast of Liquid Crystal Shutter]

Figure 5:
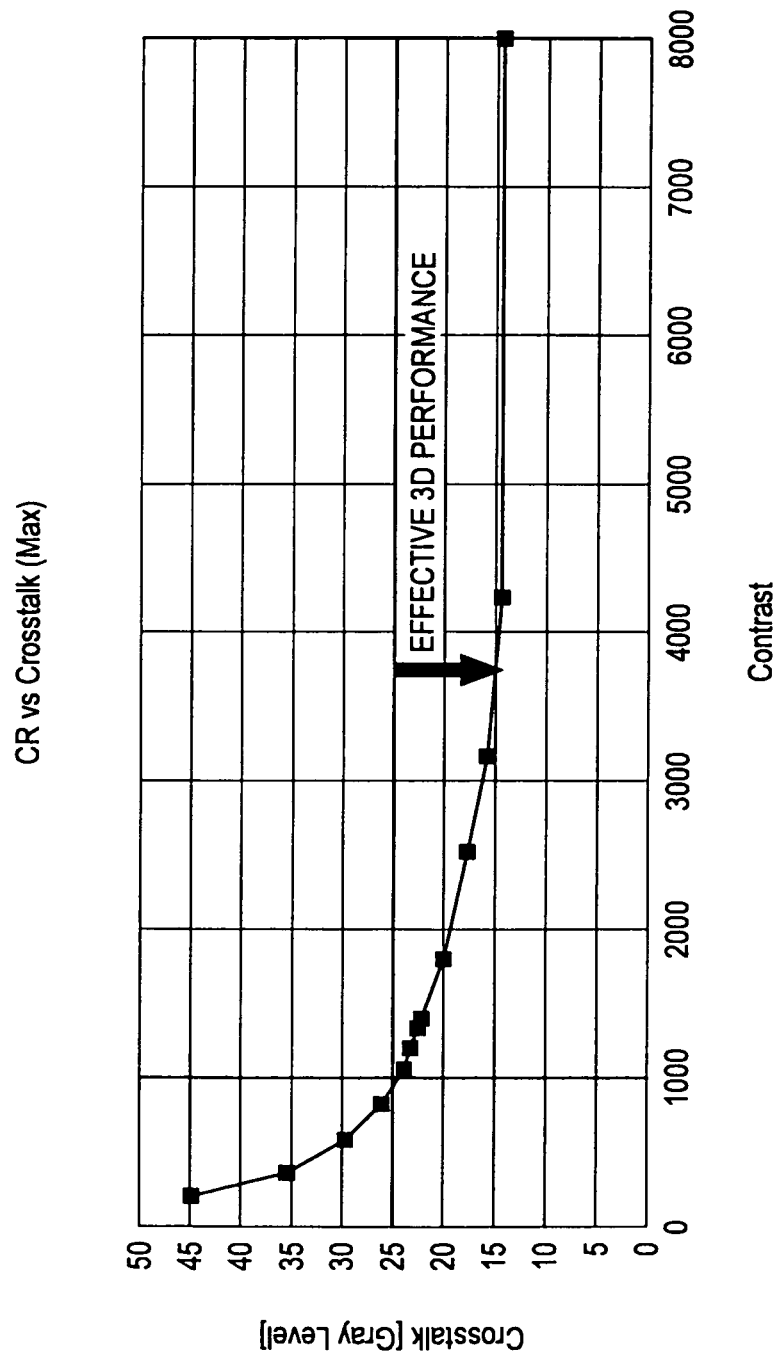
FIG. 5 is a characteristic diagram showing the relationship between the contrast between the opened state and the closed state of the liquid crystal shutters and the amount of crosstalk.

The occurrence of crosstalk is associated with light transmissivity of the liquid crystal shutters 200a, 200b, where the video that is shielding light transmits in the closed state and the crosstalk occurs if the contrast between the opened state and the closed state of the liquid crystal shutters 200a, 200b is low. FIG. 5 is a characteristic diagram showing the relationship between the contrast of the liquid crystal shutters 200a, 200b and the amount of crosstalk. In FIG. 5, the horizontal axis shows the contrast or the light of the opened state with respect to the light transmissivity of the closed state of the liquid crystal shutters 200a, 200b, and the vertical axis shows the amount of crosstalk, which is represented by converting the amount of shift from the desired luminance value in gray level. As shown in FIG. 5, the contrast is to be enhanced to reduce the amount of crosstalk, and the amount of crosstalk significantly increases if the contrast becomes smaller than 1000. In order to ensure the effective three-dimensional image performance (3D performance), the amount of crosstalk is desirably lower than or equal to 25 [gray level] according to evaluations such as luminous evaluation. Therefore, it is suitable for the contrast of the liquid crystal shutters 200a, 200b to ensure a value of greater than or equal to 1000.

[(6) Example of Writing Three Times According to Present Embodiment]

FIGS. 6A and 6B are schematic views showing an example in which the writing is continuously carried out three times for each of the right eye image R and the left eye image L through the method similar to the writing of two times. Here, FIG. 6A shows a state in which the luminance is changed with time at each position in the vertical direction from the lower side (Y=0) to the upper side (Y=Y0) of the liquid crystal display panel 132. FIG. 6B shows an opening and closing timing of the liquid crystal shutters 200a, 200b. As shown in FIG. 6B, the liquid crystal shutter R for the right eye (liquid crystal shutter 200a) is opened only for 2.8 ms from time t35 to t36. The liquid crystal shutter L for the left eye (liquid crystal shutter 200b) is opened only for 2.8 ms from time t32 to t33, and for 2.8 ms from time t38 to t39.

As shown in FIG. 6A, in the present embodiment, the right eye image R and the left eye image L are respectively displayed at the drive frequency of 360 [Hz], and the time the right eye image R or the left eye image L is displayed by one writing is $\frac{1}{360}$ [Hz]=2.8 [ms].

As shown in FIG. 6A, the left eye image L is written during the 2.8 [ms] from time t30 to t31 at the upper side (Y=Y0) of the screen, and the left eye image L is continuously written during the 2.8 [ms] from time t31 to t32. Furthermore, the left eye image L is continuously written during the 2.8 [ms] from time t32 to t33. Each left eye image L continuously written three times are basically the same image, but may differ due to adjustments such as overdrive process and the like. A predetermined blank period may be provided between the continuously written left eye images L.

The right eye image R is written after the left eye image L is written three times. For the right eye image R as well, the right eye image R is written during the 2.8 [ms] from time t33 to t34, and then the right eye image R is continuously written during the 2.8 [ms] from time t34 to t35 at the upper side (Y=Y0) of the screen. Furthermore, the right eye image R is continuously written during the 2.8 [ms] from time t35 to t36. Each right eye image T that is continuously written are basically the same image, but may differ due to adjustments such as overdrive process and the like. In writing three times as well, correction by overdrive is desirably performed in view of the response characteristics of the liquid crystal. A predetermined blank period may be provided between the continuously written right eye images R or between the left eye image L and the right eye image R.

As shown in FIG. 6A, since the left eye image L is written three times between t30 and t33, the image same as that written the first time is written the second time and the third time, whereby the image (luminance) written the first time can be held for a long period.

Therefore, in FIG. 6A, the luminance of the liquid crystal panel reached the desired level in the entire region from the upper side of the screen to the lower side of the screen in the period between time t32 and time t33. Therefore, as shown in FIG. 6B, only the left eye image L is visually recognized by the left eye of the user and the occurrence of crosstalk can be reliably suppressed by opening the liquid crystal shutter 200b only for a predetermined period (e.g., 2.8 ms) from time t32 to time t33.

Similarly, for the right eye image R as well, the image same as that written the first time is written the second time and the third time, and thus the image (luminance) written the first time can be held for a long period.

Therefore, in FIG. 6A, the luminance of the liquid crystal panel reached the desired level in the entire region from the upper side of the screen to the lower side of the screen in the period between time t35 and time t36. Therefore, as shown in FIG. 6B, only the right eye image R is visually recognized by the right eye of the user and the occurrence of crosstalk can be reliably suppressed by opening the liquid crystal shutter 200a only for a predetermined period (e.g., 2.8 ms) from time t35 to time t36.

Therefore, the desired luminance can be held for a longer time and the occurrence of crosstalk can be reduced by increasing the number of writing, and hence the open period of the liquid crystal shutters 200a, 200b can be extended. According to the example of writing three times, the crosstalk can be further reduced and the 3D video of high luminance can be displayed by opening the liquid crystal shutters 200a, 200b after writing two times. If the number of writing of relatively few for each of the right eye image R and the left eye image L, a period of opening the liquid crystal shutters 200a, 200b tends to become short to suppress crosstalk. The liquid crystal shutters 200a, 200b desirably respond in a short period of time, and the response speed is desirably smaller than or equal to 5 [ms].

As described above, according to the example of writing three times in the present embodiment, the occurrence of crosstalk in which the right eye image R and the left eye image L mix can be reliably suppressed. Furthermore, the 3D video of high luminance can be provided to the user since the desired luminance can be held for a longer period of time due to the writing of three times.

It should be understood by those skilled in the art that various modifications, combinations, sub-combinations and alterations may occur depending on design requirements and other factors insofar as they are within the scope of the appended claims or the equivalents thereof.

What is claimed is:

1. An image display apparatus comprising:
   a signal control unit configured to receive an input of an image signal, and convert to a signal for displaying each of a right eye image and a left eye image two consecutive times in a continuous manner such that a respective right or left eye image is displayed two consecutive times and thereafter the other of the respective right or left eye image is displayed two consecutive times, in which a first one of two consecutive right eye images and a second one of the two consecutive right eye images are substantially the same and in which a first one of two consecutive left eye images and a second one of the two consecutive left eye images are substantially the same; and
   a display panel, input with the signal converted by the signal control unit, configured to display the signal; and
   a luminance correction unit configured to control a luminance of each image such that a predetermined luminance of the signal is reached after the first one of consecutive images is displayed and the predetermined luminance is held during display of the second one of consecutive images.

2. The image display apparatus according to claim 1, comprising:
   a shutter control unit for generating a timing signal indicating a switching timing of the right eye image and the left eye image to notify the switching timing of the right eye image and the left eye image with respect to a viewing eyeglass having right eye and left eye shutters, wherein a period the shutter closes based on the timing signal is at least one left and right write time.

3. The image display apparatus according to claim 2, wherein the timing signal generates a period in which the right eye shutter and the left eye shutter are both closed.

4. The image display apparatus according to claim 2, wherein the period the shutter closes based on the timing signal includes at least one partial period of a first display period of the right eye image or the left eye image.

5. The image display apparatus according to claim 2, wherein the period the shutter opens based on the timing signal is at least one part of a last display period in each of the right eye image or the left eye image displayed continuously for two times.

6. The image display apparatus according to claim 1, in which each of the right eye images and the left eye images is displayed at a frequency of 240 Hz.

7. The image display apparatus according to claim 1, in which each image represents one respective frame such that a respective right eye image represents one respective right eye frame and a respective left eye image represents one respective left eye frame such that the signal from the signal control unit is for displaying of each of a right eye frame and a left eye frame two consecutive times in a continuous manner such that a respective right or left eye frame is displayed two consecutive times and thereafter the other of the respective right or left eye frame is displayed two consecutive times, in which a first one of two consecutive right eye frames and a second one of the two consecutive right eye frames are substantially the same and in which a first one of two consecutive left eye frames and a second one of the two consecutive left eye frames are substantially the same.

8. An image display observation system comprising:
an image display apparatus including a signal control unit configured to receive an input of an image signal, and convert to a signal for displaying each of a right eye image and a left eye image two consecutive times in a continuous manner such that a respective right or left eye image is displayed two consecutive times and thereafter the other of the respective right or left eye image is displayed two consecutive times, in which a first one of two consecutive right eye images and a second one of the two consecutive right eye images are substantially the same and in which a first one of two consecutive left eye images and a second one of the two consecutive left eye images are substantially the same, a display panel, input with the signal converted by the signal control unit, configured to display the signal, a luminance correction unit configured to control a luminance of each image such that a predetermined luminance of the signal is reached after the first one of consecutive images is displayed and the predetermined luminance is held during display of the second one of consecutive images, and a shutter control unit configured to generate a timing signal indicating a switching timing of the right eye image and the left eye image; and
a three-dimensional image observation eyeglass, including right eye and left eye shutters, configured to alternately open the right eye and the left eye shutters based on the timing signal.

9. The image display observation system according to claim 8, wherein a contrast ratio of light transmissivity in an opened state with respect to a closed state of the shutter is greater than or equal to 1000 in the three-dimensional image observation eyeglass.

10. The image display observation system according to claim 8, in which each of the right eye images and the left eye images is displayed at a frequency of 240 Hz.

11. The image display observation system according to claim 8, in which each image represents one respective frame such that a respective right eye image represents one respective right eye frame and a respective left eye image represents one respective left eye frame such that the signal from the signal control unit is for displaying of each of a right eye frame and a left eye frame two consecutive times in a continuous manner such that a respective right or left eye frame is displayed two consecutive times and thereafter the other of the respective right or left eye frame is displayed two consecutive times, in which a first one of two consecutive right eye frames and a second one of the two consecutive right eye frames are substantially the same and in which a first one of two consecutive left eye frames and a second one of the two consecutive left eye frames are substantially the same.

12. An image display method, comprising the steps of:
receiving an input of an image signal, and converting to a signal by a signal control unit for displaying each of a right eye image and a left eye image two consecutive times in a continuous manner such that a respective right or left eye image is displayed two consecutive times and thereafter the other of the respective right or left eye image is displayed two consecutive times, in which a first one of two consecutive right eye images and a second one of the two consecutive right eye images are substantially the same and in which a first one of two consecutive left eye images and a second one of the two consecutive left eye images are substantially the same;
receiving the signal converted by the signal control unit and displaying the signal; and
controlling a luminance of each image such that a predetermined luminance of the signal is reached after the first one of consecutive images is displayed and the predetermined luminance is held during display of the second one of consecutive images.

13. The image display method according to claim 12, in which each of the right eye images and the left eye images is displayed at a frequency of 240 Hz.

14. The image display method according to claim 12, in which each image represents one respective frame such that a respective right eye image represents one respective right eye frame and a respective left eye image represents one respective left eye frame such that the signal from the signal control unit is for displaying of each of a right eye frame and a left eye frame two consecutive times in a continuous manner such that a respective right or left eye frame is displayed two consecutive times and thereafter the other of the respective right or left eye frame is displayed two consecutive times, in which a first one of two consecutive right eye frames and a second one of the two consecutive right eye frames are substantially the same and in which a first one of two consecutive left eye frames and a second one of the two consecutive left eye frames are substantially the same.

15. An image display apparatus comprising:
a signal control unit for receiving an input of an image signal, and converting to a signal for displaying each of a right eye image three consecutive times and a left eye image three consecutive times in a continuous manner such that a respective right or left eye image is displayed three consecutive times and thereafter the other of the respective right or left eye image is displayed three consecutive times, in which a first one of three consecutive right eye images and a second one of the three consecutive right eye images and a third one of the three consecutive right eye images are all substantially the same, and in which a first one of three consecutive left eye images and a second one of the three consecutive left eye images and a third one of the three consecutive left eye images are all substantially the same; and a display panel, input with the signal converted by the signal control unit, for alternately displaying the right eye image continuing three times, and the left eye image continuing three times.

* * * * *